United States Patent [19]

Kazlauskas et al.

[11] 4,365,132
[45] Dec. 21, 1982

[54] WELDING APPARATUS FOR POLYGONAL CROSS-SECTIONED TUBING

[76] Inventors: Gasparas Kazlauskas, 4455 Los Feliz, Apt. 1108, Los Angeles, Calif. 90027; Vytautas J. Jusionis, 5302 Clark Cir., Westminster, Calif. 92683; Max M. Westerberg, 4658 Brewster Dr., Tarzana, Calif. 91356; John W. Meacham, 2028 Las Lunas St., Pasadena, Calif. 91107

[21] Appl. No.: 947,357

[22] Filed: Oct. 2, 1978

[51] Int. Cl.³ .................. B23K 9/225; B23K 9/02; B23K 9/12; B23K 37/02
[52] U.S. Cl. .................. 219/60 A; 219/124.02; 219/124.22; 219/125.11; 228/29
[58] Field of Search .................. 219/59.1, 60 R, 60 A, 219/124.02, 124.22, 124.31, 124.33, 125.11; 228/9, 29

[56] References Cited

U.S. PATENT DOCUMENTS

| | | | |
|---|---|---|---|
| 2,303,720 | 12/1942 | Berkeley | 219/125.11 |
| 3,176,897 | 4/1965 | Tucker | 219/60 A |
| 3,266,701 | 8/1966 | Peignen | 219/60 A |
| 3,708,647 | 1/1973 | Acker | 219/60 A |
| 3,737,614 | 6/1973 | Paulange | 219/60 A |
| 3,823,298 | 7/1974 | Rohrberg et al. | 219/60 A |
| 3,871,062 | 3/1975 | Adachi et al. | 219/124.33 X |
| 3,873,798 | 3/1975 | Friedman et al. | 219/60 A |
| 4,112,289 | 9/1978 | Mead et al. | 219/125.11 X |
| 4,118,620 | 10/1978 | Wall, Jr. et al. | 219/124.22 X |
| 4,145,593 | 3/1979 | Merrick et al. | 219/125.11 X |
| 4,177,913 | 12/1979 | Iwamoto et al. | 219/60 A X |

FOREIGN PATENT DOCUMENTS

| | | | |
|---|---|---|---|
| 2808337 | 9/1978 | Fed. Rep. of Germany | 219/59.1 |
| 46-42603 | 12/1971 | Japan | 228/29 |
| 48-00730 | 1/1973 | Japan | 228/29 |
| 55-36072 | 3/1980 | Japan | 219/125.11 |
| 707737 | 1/1980 | U.S.S.R. | 219/125.11 |

*Primary Examiner*—J. V. Truhe
*Assistant Examiner*—Keith E. George
*Attorney, Agent, or Firm*—Jack C. Munro

[57] ABSTRACT

A welding apparatus which is designed to weld together tubular members having any exterior configuration. The welding electrode is mounted on mounting structure which in turn is movably mounted upon the periphery of a housing. The workpiece to be welded is fixedly secured and centrally disposed within the housing. The welding head is to move about the workpiece and also tilt in respect thereto to maintain the longitudinal center axis of the welding electrode continuously perpendicular to the workpiece surface. Step motors are employed to both drive the welding head about the workpiece and also tilt the welding head with respect to the workpiece. The particular exterior configuration of the workpiece has been preprogramed into a memory unit. The memory unit operates through an electronic circuit to operate the step motors to locate the welding head at the precise desired location along the entire length of the welding path.

6 Claims, 18 Drawing Figures

WELDING APPARATUS FOR POLYGONAL CROSS-SECTIONED TUBING

BACKGROUND OF THE INVENTION

The field of this invention relates to the welding of separate metallic tubular members by a known welding technique such as a gas shielded, tungsten, electro-arc welding process. More particularly, this invention relates to a welding apparatus which is preprogramed to automatically weld a particular exteriorly configured structure to produce an extremely strong weld not having any flaws throughout the entire length of the weld.

The use of equipment to automatically weld cylindrical members has been known previously. An example of such an automatic welding device is shown and disclosed within U.S. Pat. No. 3,777,115, issued Dec. 4, 1973, entitled APPARATUS FOR CONTROLLING ELECTRODE OSCILLATION. In such a welding apparatus, the location of the welding electrode, must be precisely controlled. This precise control, in order to achieve optimum quality weld, is concerned with the distance the welding electrode is from the weld area, the arc voltage, the welding current and so forth.

In the welding of a cylinder, the welding head only need move in a circular path about the exterior cylindrical surface of the workpiece. Because the exterior surface of the workpiece is cylindrical, the welding procedure is somewhat simplified.

However, what if the cylindrical surface of the workpiece is not cylindrical, that is, polygonal shaped, or elliptically shaped, or any shape other than cylindrical. Previous to this invention there was not known an automatic welding device capable of welding such shapes. The reason for this was that there are sharp corners in a polygonal shaped workpiece which would require the welding electrode to move around the corners and it would be very difficult to maintain the precise spacing of the welding electrode from the weld area in order to achieve the optimum weld quality.

Since a great many tubular structures are not cylindrical, it would be desirable to design some form of welding apparatus which could automatically weld non-cylindrical tubular members and produce a flawless weld.

SUMMARY OF THE INVENTION

The welding apparatus of this invention employs the use of a welding head which is mounted for tilting movement on a main member of a driving assembly. The driving assembly is composed of several interconnected segments. The entire driving assembly and the welding head apparatus is rotatably mounted upon the circular exterior surface of a housing. The housing includes an internal, centrally disposed, enlarged opening. The housing is also formed of a pair of separate members which are interlocked together to form a single unit. With the pair of members being separated, access through the wall of the housing would be provided to the enlarged central opening. The workpiece to be welded is to be fixedly positioned within the enlarged opening and centrally disposed in respect thereto. Driving of the welding head apparatus about the workpiece is accomplished through a step motor which operates through a gear arrangement. Tilting of the welding head with respect to the driving assembly is accomplished also by means of a second step motor operating through a second gear arrangement. The workpiece supporting the structure of the housing is changeable to accommodate different exterior workpiece configurations. An electrical circuit operates the step motors to locate the welding electrode of the welding head at a precise location at each point along the entire length of the welding path. The electrical circuit includes the use of a preprogramed memory unit with therebeing a particular said memory unit for each exterior configuration of workpiece. The output of the memory unit is transmitted to a data rate multiplier assembly which multiplies the output signal of the memory by a numerical value corresponding to the frequency operation of the step motors. The resulting output signal from the data rate multiplier is then used to operate the step motors.

The primary objective of this invention is to construct a welding apparatus which will automatically weld together tubular members regardless of the exterior configuration of the tubular members.

A further objective of this invention is to construct a welding apparatus which can be readily changed in a short period of time to accommodate different exterior workpiece configurations.

The overall objective of the structure of this invention is to automatically weld tubular members so as to produce the highest quality welding of the tubular members.

DETAILED DESCRIPTION OF THE SHOWN EMBODIMENT

Referring to the drawings, there is shown generally a welding head 20. This welding head 20 is deemed to be known and is basically similar to the structure of U.S. Pat. No. 3,777,115, issued Dec. 4, 1973, entitled APPARATUS FOR CONTROLLING ELECTRODE OSCILLATION. Basically the welding head 20 includes motor structure to move the welding electrode 22 either closer to the welding area or further away from the welding area. Also, there may be included a structure to oscillate the welding electrode 22 transversely across the weld path. The structure to effect movement of the electrode has been described in the previously mentioned patent and reference is to be had to the aforementioned patent for a description of such structure. It is to be understood that the position of the electrode 22 is determined by a feedback of the welding current to a computer (not shown). A computer would compare the actual welding current to a predetermined value of welding current and then apply a signal to an appropriate servosystem to control a motor, which, in turn, would move the electrode to bring the welding current in line with the pre-established value.

The welding head 20 is removably connected by means of a dove tail joint 26 to an extension 28. The extension 28 is integrally formed and extends outwardly from the surface of a plate 24. The plate 24 is pivotally mounted by means of a pin assembly 30 to a mounting plate 32. The mounting plate 32 is fixedly mounted by means of set screws onto a pair of rods 34 and 36. The rods 34 and 36 are slidingly mounted through openings formed within a member 38. The pins 34 and 36 extend entirely through the member 38 and on the back side thereof are fixedly secured to a plate 40. The plate 40 has mounted thereon a first step motor (control motor) 42. The motor 42 is to be electrically driven through an electrical control system shown generally in block diagram form within FIG. 18 of the drawings.

The output shaft 44 of the motor 42 is connected to a flexible connector 46. The flexible connector in turn is secured to a rod 48. The rod 48 terminates in a gear 50. The rod 48 is supported by means of a bearing assembly 52 located directly adjacent the gear 50. The bearing assembly 52 is mounted within the mounting plate 32.

The gear 50 meshes with a segment of a ring gear 54. The ring gear is fixed to the inside of plate 24. Therefore, it can be seen by activation of the motor 42, the plate 24 as well as the welding head 20 is pivoted in respect to the mounting plate 32. This pivoting constitutes tilting of the electrode 22 in respect to the workpiece 56. It is to be noted that the workpiece 56 is shown substantially square, but each of the corners have a small flat area. The workpiece therefore assumes a polygonal shape having eight different sides.

To facilitate the observing of the amount of tilting of the welding head 20 in respect to the plate 32, indicia 58 is inscribed on the periphery of the plate 24, which is to be observed in conjunction with a specific spot inscribed on the periphery of the plate 32.

It is to be noted that the plate 32, by being mounted on the pins 34 and 36, is capable of a small amount of sliding movement toward and away from the member 38. This permits the welding electrode 22 to be adjusted a small amount in the longitudinal direction with respect to the workpiece 56. To facilitate this "fine" adjustment, adjustment rod 60, which is attached to knurled knob 62, is threadably secured in the member 38. The free end of the rod 60 is fixedly secured by a set screw 64 to the mounting plate 32. By rotating of the knob 62, there is relative movement between knobs 62 and rod 60. Since the rod 60 is longitudinally fixed with respect to the plate 32, the rod 60 is moved in respect to the member 38 which in turn causes movement of the plate 32 toward or away from the member 38.

Workpiece 56 is centrally located and securely held within an enlarged opening 66. The opening 66 is formed about the ring shaped housing 68. The ring shaped housing 68 is constructed principally of a main member 70 and a second member 72. The member 72 is substantially smaller than the member 70 and is to interlock with the member 70 through a tongue 74 and groove 76 arrangement. With the members 72 and 70 interlocked together, the housing 68 comprises a continuously formed ring. The purpose of the constructing of the housing 68 of a pair of members 70 and 72 is so that with the member 72 removed, there is provided lateral access into the enlarged opening 66.

Fixedly attached by a plurality of bolts 80 to the member 70 and located within the opening 66 is a fixed holding device 78. The inside portion of the holding device 78 is configured to accommodate the particular configuration of workpiece 56. It is to be understood that different types of holding devices 78 could be substituted which have different interior configurations so as to accommodate a particular shape of workpiece other than the configuration of workpiece 56. It is considered to be within the scope of this invention that any shape of holding device 78 could be employed to correspond to whatever shape of workpiece, therebeing a single holding device configuration for each workpiece configuration.

Similarly, a movable holding device 82 is interiorly configured to meet with the particular configuration of workpiece 56. It is to be understood that the particular configuration of the movable holding device 82 will always match the configuration of the fixed holding device 78. The movable holding device 82 is attached by a set screw 84 to a bolt 86. The set screw 84 includes an extension 88 which rides within a groove 90 formed within the bolt 86. The innermost end of the bolt 86 presses against a leaf spring 92 to not permit play between the bolt 86 and the movable holding device 82.

By turning of the bolt 86 by connection with a wrench (not shown) to the head of the bolt 86, the movable holding device 82 does not rotate with the bolt 86 but does move longitudinally along with the bolt. Therefore, by moving the movable holding device 82 into tight contact with the workpiece 56, the workpiece 56 will then be fixedly bound between the holding devices 82 and 78.

Located about the exterior surface of the members 70 and 72 are a row of gear teeth forming a ring gear 94. The ring gear 94 is to be engaged by gear 96. Gear 96 is fixedly mounted on a shaft 98. The shaft 98 is rotatably supported upon the member 38. The free end of the shaft 98 connects to a step motor (drive motor) 100. The step motor 100 would also be electrically driven by the electrical circuitry represented generally within FIG. 18.

Also mounted on the shaft 98 are a pair of guide wheels 102. On the opposite end of the member 38 are a second pair of guide wheels 104 mounted on a shaft 106. Shaft 106 is rotationally supported in respect to the member 38. It is to be noted that the overall configuration of the member 38 is to conform about the exterior surface of the housing 68.

A member 108, which is basically similar in configuration to member 38, is to be located diametrically opposite member 38 in respect to the housing 68. In a similar manner the member 108 also includes guide wheels 110 which are mounted onto a pair of spaced apart shafts 112. The guide wheels 102, 104, and 110 are to low frictionally roll within a pair of guide grooves 114 and 116 formed in the exterior of the housing 68.

Interconnecting the members 38 and 108 is a lower interconnecting member 118 and an upper interconnecting member 120. The interconnecting member 118 has a slot 122 at each end thereof with one slot 122 to cooperate about the shaft 112 and the other slot 122 to cooperate about the shaft 106. Similarly, the member 120 has a pair of slots 124 with a slot 124 to cooperate about a shaft 112 with the other slot 124 to cooperate about the shaft 98.

The member 120 is composed of a pair of separate members which are connected by a bolt 126. The bolt 126 includes an enlarged head 128 which operates against the coil spring 130. The opposite end of the spring 130 rides against upstanding member 132 which is integrally formed upon the member 134. The bolt 126 passes through an appropriate opening formed within the upstanding member 132 and is threadably engaged with upstanding member 136 which is integrally formed upon the member 138.

Figure 1:
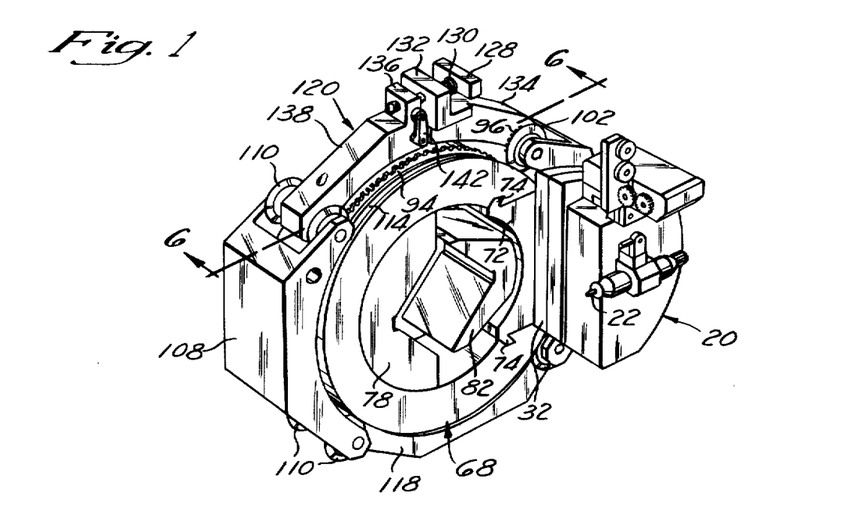
FIG. 1 is an isometric view of the welding apparatus of this invention.
Figure 2:
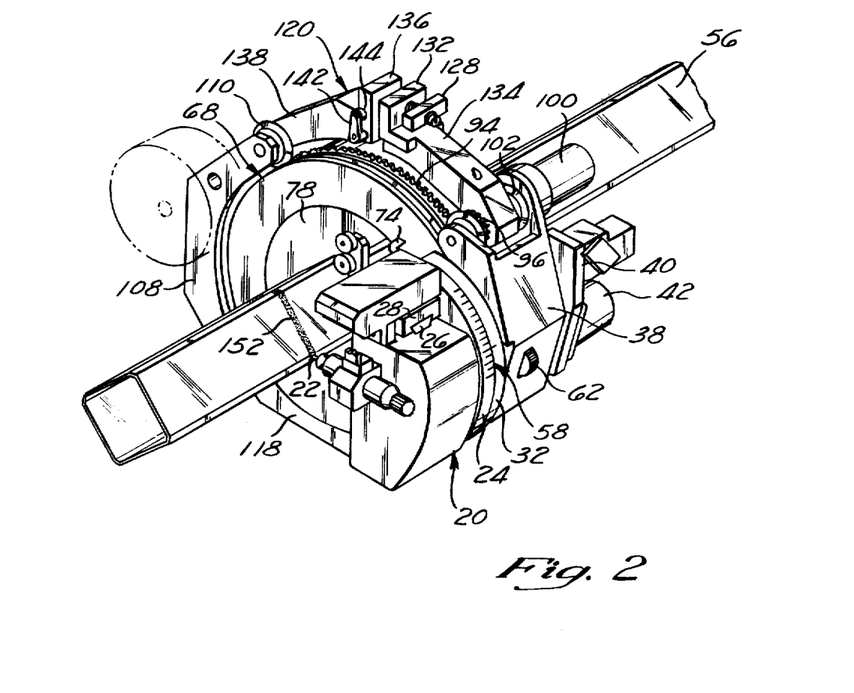
FIG. 2 is an isometric view similar to FIG. 1 but taken from another direction showing the welding apparatus in a position to weld together a pair of polygonal shaped members.
Figure 3:
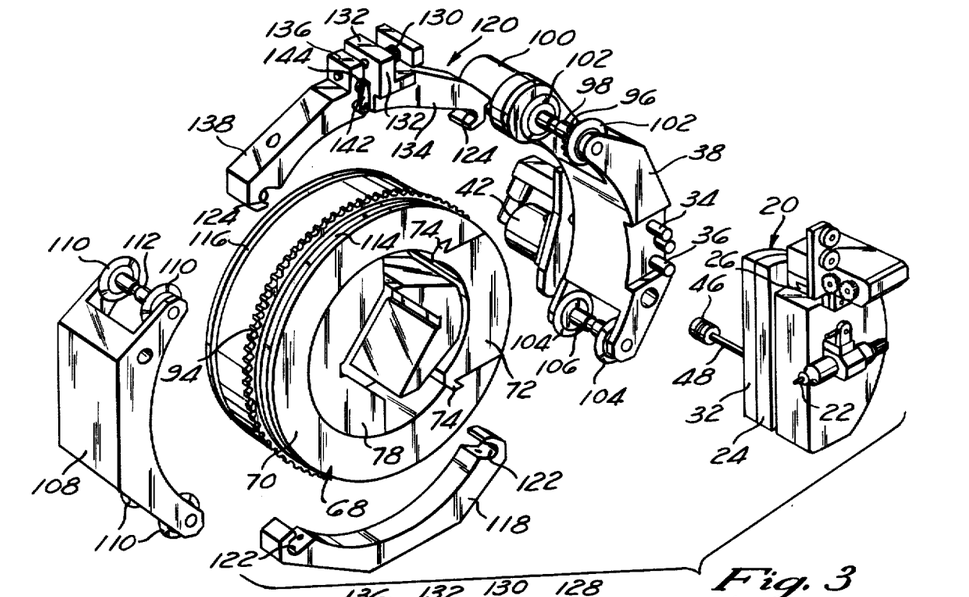
FIG. 3 is an exploded isometric view of the welding apparatus of this invention.
Figure 4:
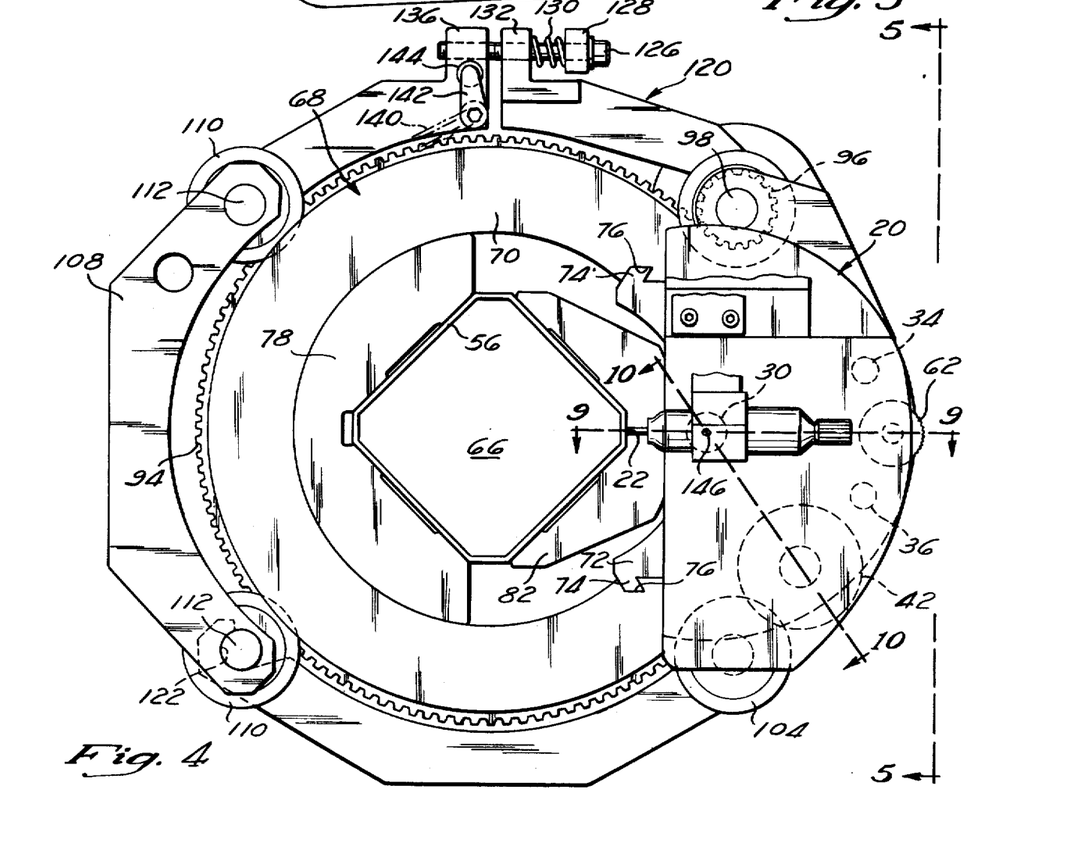
FIG. 4 is a front view of the welding apparatus to this invention.
Figure 5:
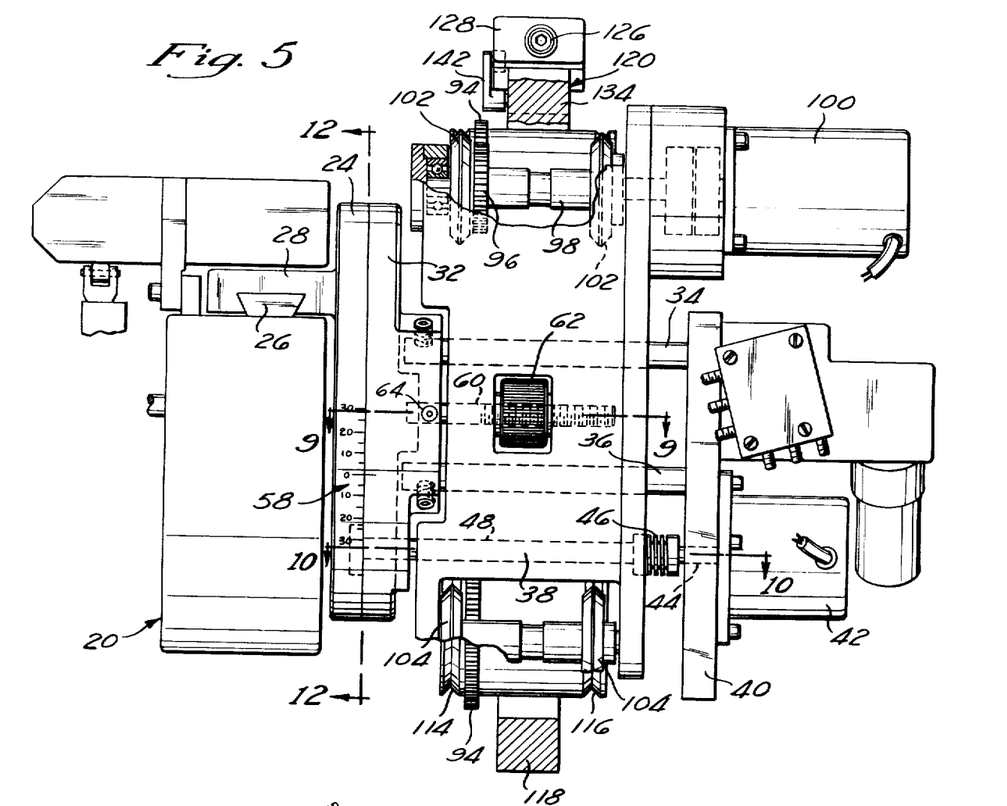
FIG. 5 is a side view of the welding apparatus of this invention taken along line 5—5 of FIG. 4.

With the coil spring 130 extended and the member 132 located very near the member 136 as shown in FIG. 3 of the drawings, the slots 124 are tightly held about their respective shafts 112 and 98 and also the slots 122 will be snugly engaged with the shafts 112 and 106. This means that the entire driving assembly formed around the members 38, 108, 118, and 120 is mounted on the exterior of the housing 68. It is capable of movement in respect thereto by operation of the motor 100 which operates through gears 94 and 96 to move the guide wheels 104, 102, and 110 within the grooves 114 and 116.

Figure 6:
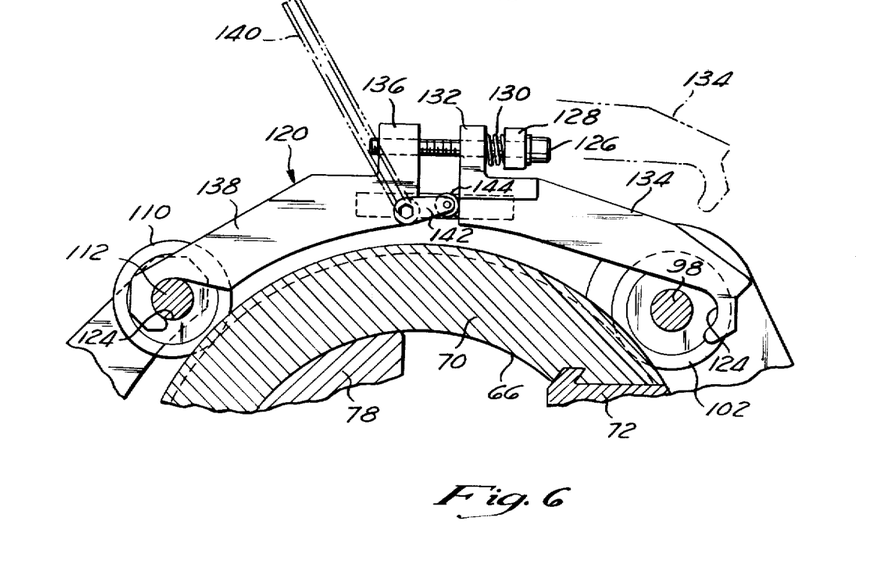
FIG. 6 is segmental cross-sectional view through a portion of the welding apparatus of this invention taken along line 6—6 of FIG. 1.
Figure 7:
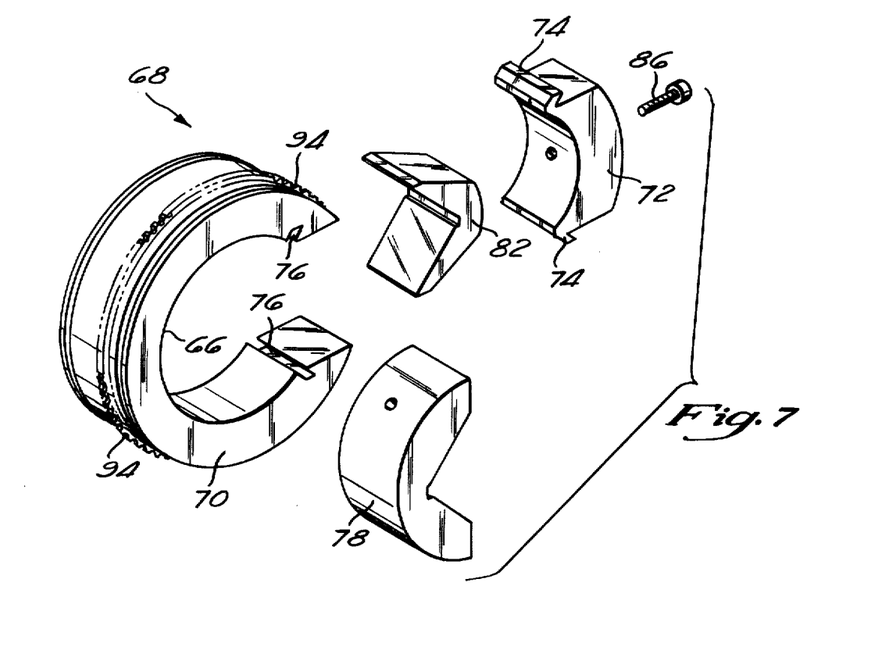
FIG. 7 is an exploded isometric view of the housing assembly which is mounted about the workpiece and provides a support for the welding head structure.
Figure 8:
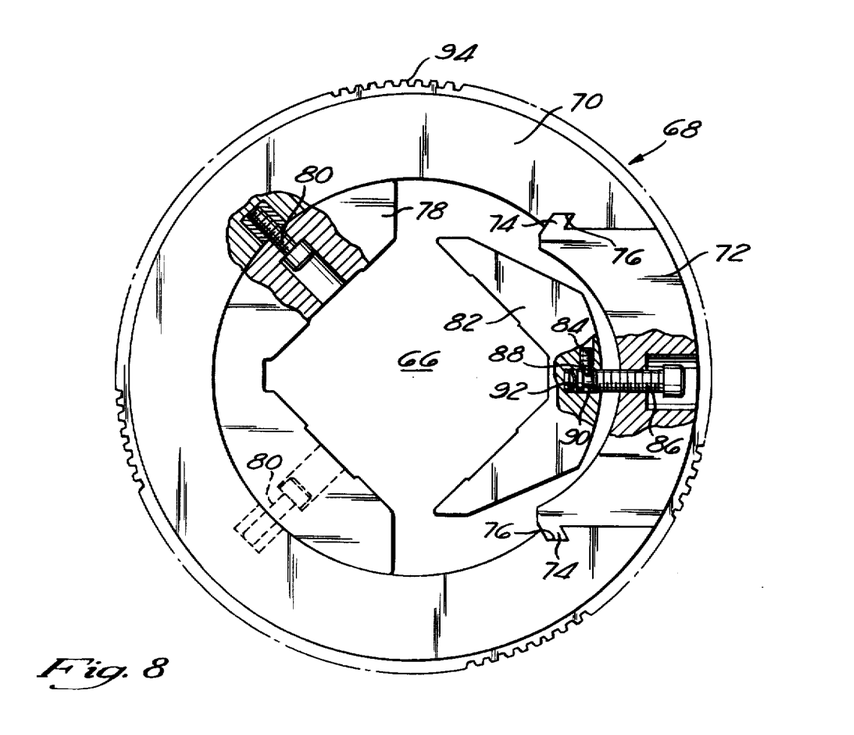
FIG. 8 is a front view of the assembled housing structure of FIG. 7.
Figures 9, 10, 11, 12:
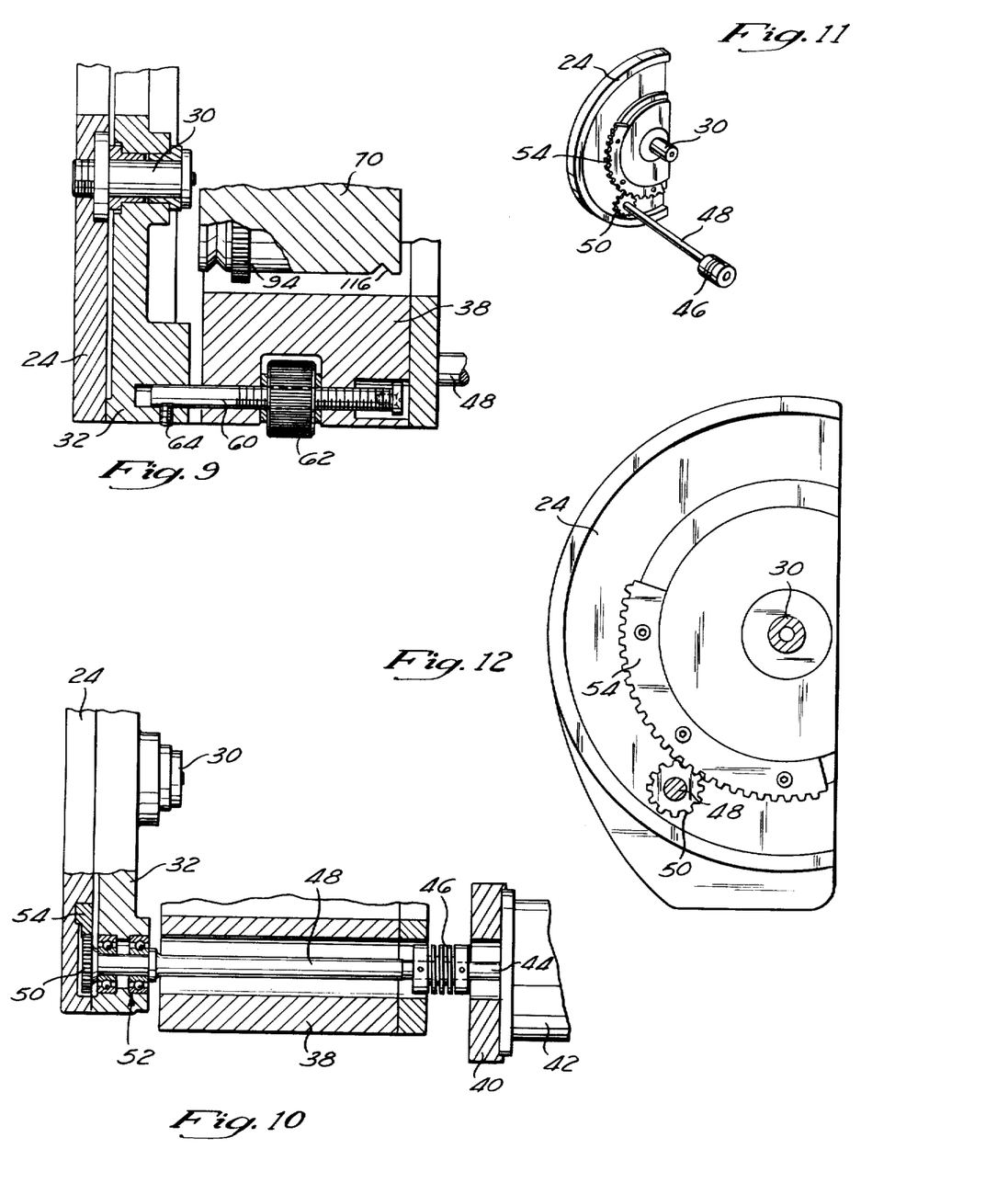
FIG. 9 is a segmental cross-sectional view taken along line 9—9 of FIG. 5.
FIG. 10 is a segmental, cross-sectional view taken along line 10—10 of FIGS. 4 and 5.
FIG. 11 is a partial, isometric view of the gear arrangement which is to be operated by a motor which is to control the tilt of the welding head.
FIG. 12 is a front view from the structure of FIG. 11.
Figures 13, 14:
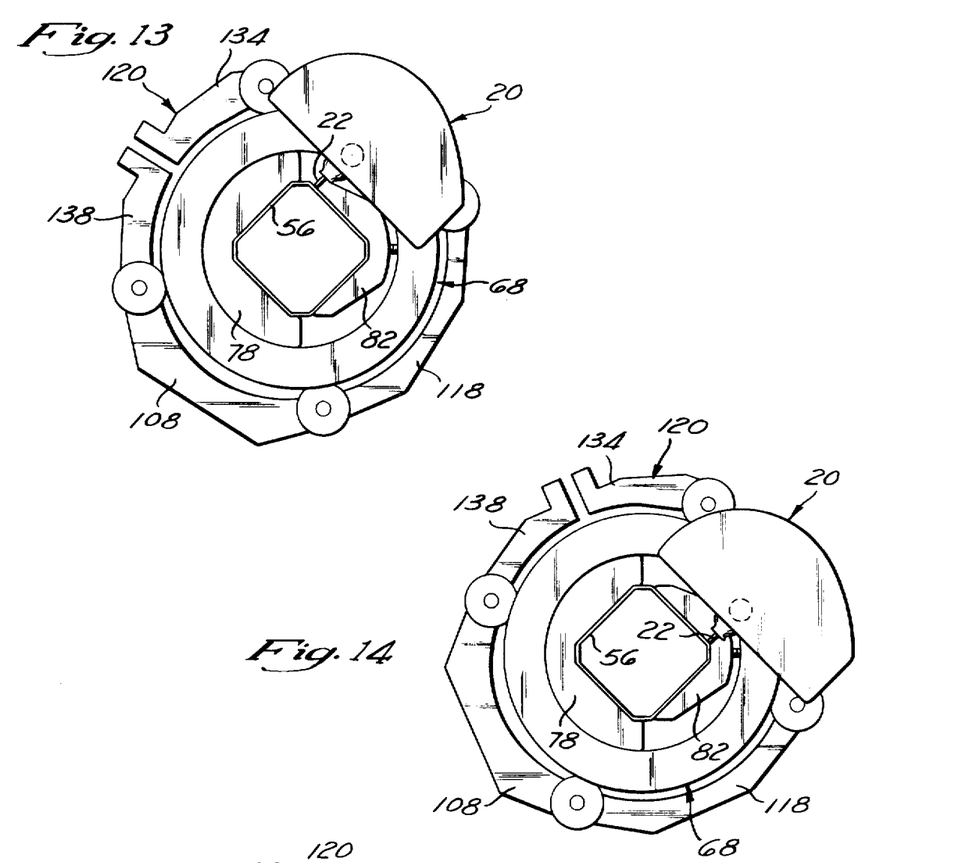
FIG. 13 is a diagramatic view of this invention showing the welding head in a first position.
FIG. 14 is a view similar to FIG. 13 showing the welding head in a different position.
Figure 15:
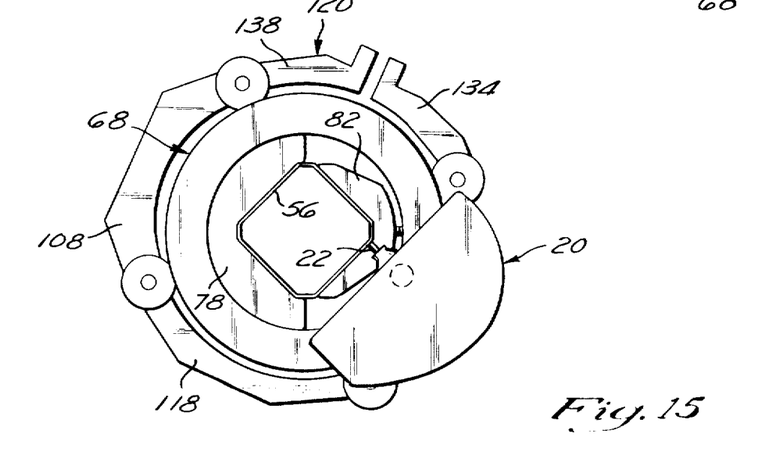
FIG. 15 is a view similar to FIG. 14 but showing the welding head in another position with respect to the workpiece.

When it is desired to disassociate the driving assembly from the housing 68, the operator only need to engage wrench 140 with lever 142 and rotate roller cam 144 against the member 134 as shown within FIG. 6 of the drawings. This causes the member 134 to be moved away from the member 138 and disengage the slot 124 from the pivot shaft 98. This then permits the removal of the entire member 120 which then permits the removal of the other members 38, 118 and 108 from the housing 68. This means the welding head 20 can be readily removed from the housing 68 and replaced when desired. Frequently, this removal is part of disconnecting housing 68 into the separate members 70 and 72 so as to permit lateral entry of the workpiece 56 into enlarged opening 66.

Figure 16:
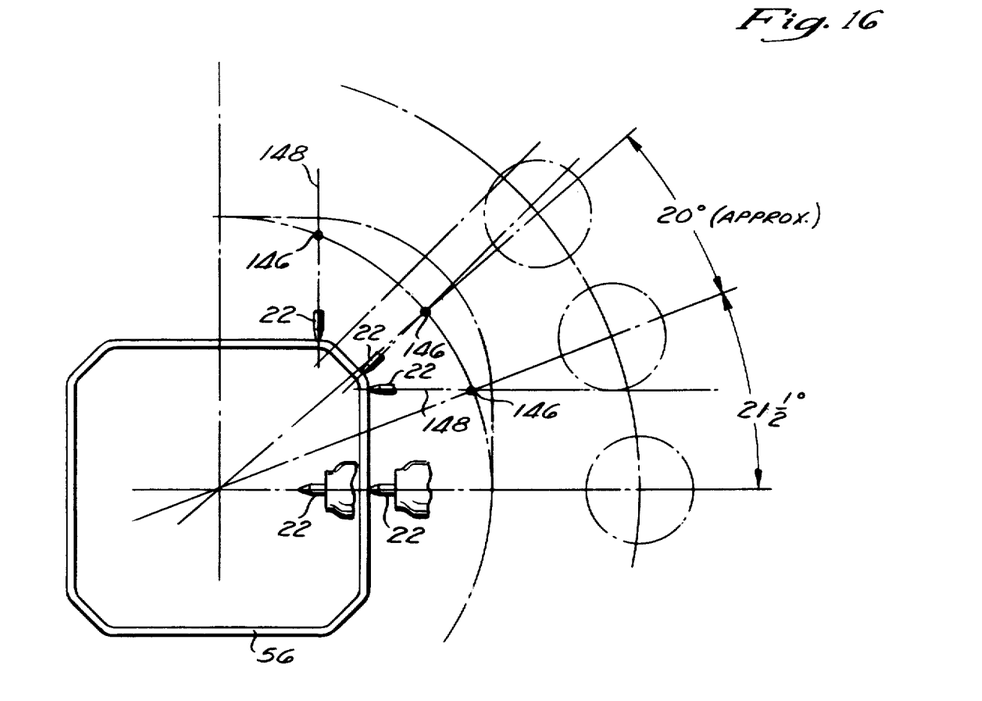
FIG. 16 is a diagram depicting the movement of the welding electrode in respect to a particular first configuration of workpiece.

Referring in particular to FIG. 16, there is diagramatically shown the movement of the electrode 22 about a flattened corner of the workpiece 56. The pivot axis 146 (axis of tilt) is moved accurately as shown in FIG. 16 and at the same time the longitudinal center axis 148 of the electrode 22 is moved through ninety degrees.

Figure 17:
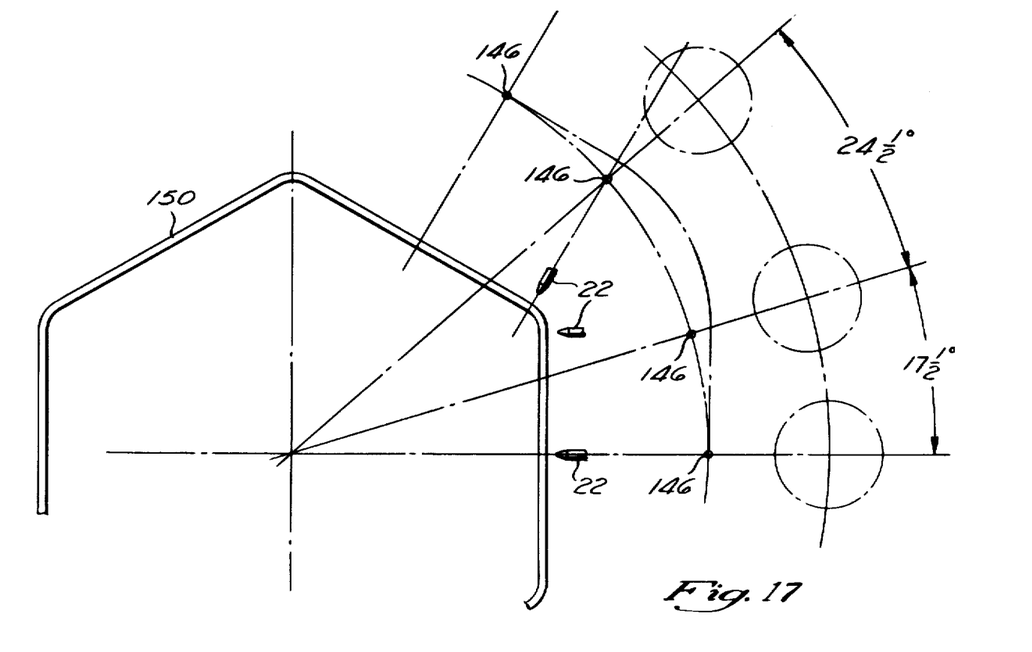
FIG. 17 is a view similar to FIG. 16 but showing the movement of the welding electrode with respect to a second configuration of workpiece.

Referring in particular to FIG. 17, there is shown the moving of the electrode 22 about a different configuration of workpiece 150. Note in particular that the angular movements of the welding electrode 22 is different in FIG. 17 from FIG. 16.

The moving of the electrode 22 is to be accomplished from point to point on the entire length of produced weld bead 152. The ascertaining of the physical values will be employed in conjunction with a memory unit which is then preprogramed and should be inserted within the appropriate electrical circuit, shown in block diagram form in FIG. 18, to operate the motors 42 and 100. It is by this whole operation of the motors 42 and 100 that the welding electrode 22 is to be moved about the workpiece 56 (or 150) in the precise manner to achieve optimum welding conditions. At any given point along the weld bead 152, the desired location of the electrode 22 is obtained through the combination of the drive step motor 100 and the tilt step motor 42.

Figure 18:
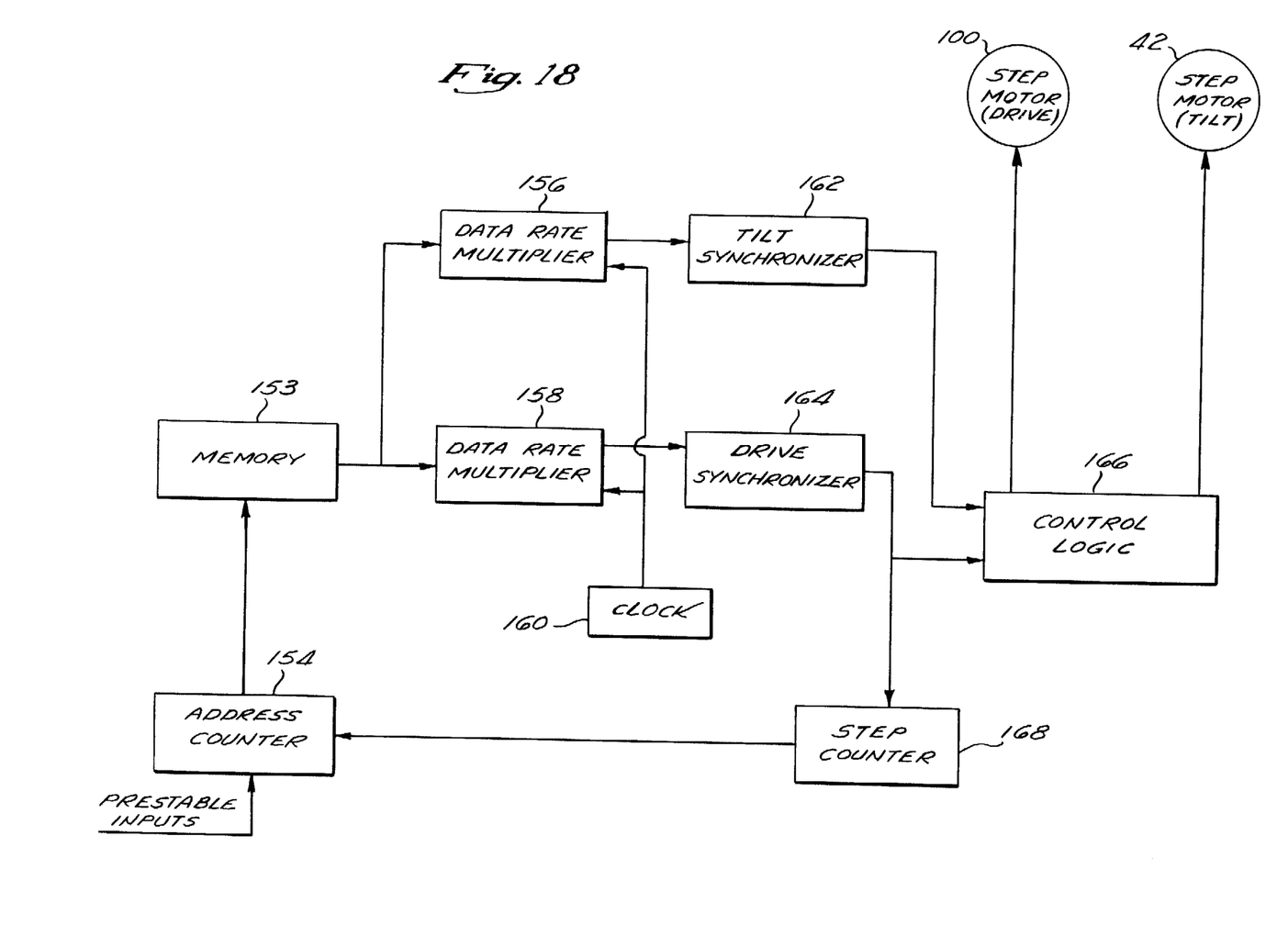
FIG. 18 is an electrical block diagram of the electronic circuitry which is employed to effect the welding operation of the welding apparatus of this invention.

Referring in particular to FIG. 18 of the drawings, there is shown the electrical circuit used in conjunction with the welding apparatus of this invention. The purpose of the circuit is to give precise commands to the servosystems which comprises generally motors 42 and 100 to precisely position the electrode 22 with respect to the workpiece. In doing this positioning of the electrode, as previously mentioned, it is possible to weld any special geometry pipe or tubing.

The main part of the electrical circuit is the memory 153. The memory consists of an integrated microcircuit chip. The chip is commercially available and is to include thousands of separate bits of information. Each time the chip receives an input impulse a particular different bit of information is read and the bits are read in a sequential manner from the first bit to the last bit of information.

Presetable inputs are to be supplied into an address counter 154. The address counter is a pointer register which contains a number for each bit of information in the memory 153. The address counter during a weld will count through all of the memory addresses incrementing every preset number of step commands to the motor. The data out of this address counter is fed to the memory 153.

The output from the memory is transmitted to a pair of data rate multipliers 156 and 158. The data rate multiplier 156 is for tilt while the data rate multiplier 158 is for drive. The date rate multipliers are also to receive input from a clock 160. The clock merely transmits a particular frequency (manually selectable) to the data rate multipliers 156 and 158. The data rate multipliers 156 and 158 take the clock frequency pulses and multiplies such times the data from the memory and outputs a stream of unprocessed pulses at a desired frequency. For example if the clock frequency is 1000, and the output data from the memory is 888, the output will be 888 divided by 1000, which would mean there would be 888 pulses for every 1000 clock pulses. It is to be noted that the frequency of the clock can be readily adjusted.

It is to be an important part of this invention that it has not been known to employ the use of a memory in conjunction with a data rate multiplier. Frequently, a memory of this type is used in conjunction with a microprocessor with the control of the memory being transmitted to the memory by means of the microprocessor. In this invention, there is no microprocessor and the output of the memory is supplied to the data rate multiplier. This means that a substantially smaller amount of electronic circuitry need be employed in the electrical circuit of this invention as opposed to previous electrical circuitry to achieve the same end result.

The unprocessed pulses from the data rate multipliers are conducted through step synchronizers 162 and 164. The purpose of the step synchronizers 162 and 164 is to shape the signals from the data rate multiplier and for the signals to have the correct voltage and the correct current to operate the motors 42 and 100. The motors 42 and 100 are what is referred to as step motors and that is a motor that moves its shaft a given amount for each pulse that it receives. In this way, varying the rate at which the pulses are transmitted to the motor, by knowing the speed of the motor and counting the number of pulses gives us the precise amount of rotation of the motor shaft. Prior to transmission of the siganls to the motors 42 and 100, the signals from the step synchronizers 162 and 164 are passed through a control logic 166 which is an array of logic gates and latches which will function to further shape the signal prior to transmission to the motors 42 and 100.

The signal from the step synchronizer 164 is also connected to a step counter 168 which counts the pulses out of the synchronizer 164 and produces an output to the address counter 154. The pulses from the step counter to the address counter increments the address counter one number for each pulse. In actual practice, the step counter will emit an output signal to the address counter 154 for each seven in number of steps of each of the motors 42 and 100. Each time the address counter is pulsed, the memory 152 receives an input signal.

What is claimed is:

1. The welding apparatus for producing a weld on a workpiece, said welding apparatus comprising:
 a housing having an internal opening, said workpiece to be located in said internal opening, said workpiece being tubular, said workpiece having a polygonal cross-sectional configuration;
 a welding electrode assembly mounted by mounting means on said housing, said welding electrode assembly being movable on said housing around said internal opening, said mounting means comprises:
 a driving assembly movably mounted on said housing, said welding electrode assembly being pivotally mounted on said driving assembly, said driving assembly to move said welding electrode assembly about the workpiece, said workpiece having an exterior surface, said welding electrode assembly including a welding electrode, said welding electrode having a longitudinal center axis, control means continuously maintaining said longitudinal center axis perpendicular to said external surface of said workpiece as said welding electrode moves around said workpiece, said driving assembly being composed of a plurality of separate connected members, locking means for securely connecting together said separate members in position around said housing, said locking means being releasable to disassociate said members from said housing, said connected members forming a totally enclosed area within which is located said housing, said connected members being hooked together through an engaging slot and shaft assembly; and
 one of said separate connected members being formed of two in number of members, said two in number of members being connected together by a third member, one of said two in number of members being slidable on said third member toward and away from the other of said two in number of members, a biasing means located about said third member exerting a continuous bias upon said two in number of members tending to locate said two in number of members as close together as possible, a pivotable cam mounted on one of said two in number of members, said pivotal cam to be pivoted pushing against the other of said two in number of members causing said two in number of members to move apart against the bias of said biasing means thereby permitting disassociation of said separate connected members from said housing.

2. The welding apparatus as defined in claim 1 wherein:
 said welding apparatus further comprises holding devices, said workpiece being fixedly held in position by means of a plurality of said holding devices, said holding devices being located within said internal opening, at least one of said holding devices being fixedly secured to said housing and at least another one of said holding devices being movable toward and away from said fixed holding device, whereby said workpiece is tightly held by said holding devices by moving said movable holding device toward said fixed holding device and clamping said workpiece therebetween.

3. The welding apparatus as defined in claim 2 wherein:
 said control means including a control motor, said control motor being connected to said welding electrode assembly to pivot such in respect to said driving assembly, the operation of said control motor being controlled by a preprogrammed electronic circuit.

4. The welding apparatus for producing a weld on a workpiece, said welding apparatus comprising:
 a housing having an internal opening, said workpiece to be located in said internal opening, said workpiece being tubular, said workpiece having a polygonal cross-sectional configuration;
 a welding electrode assembly mounted by mounting means on said housing, said welding electrode assembly being movable on said housing around said internal opening, said mounting means comprises:
 a driving assembly movably mounted on said housing, said welding electrode assembly being pivotally mounted on said driving assembly, said driving assembly to move said welding electrode assembly about the workpiece, said workpiece having an exterior surface, said welding electrode assembly including a welding electrode, said welding electrode having a longitudinal center axis, control means continuously maintaining said longitudinal center axis perpendicular to said external surface of said workpiece as said welding electrode moves around said workpiece, said driving assembly being composed of a plurality of separate connected members, locking means for securely connecting together said separate members in position around said housing, said locking means being releasable to disassociate said members from said housing, said connected members forming a totally enclosed area within which is located said housing, said connected members being hooked together through an engaging slot and shaft assembly;
 one of said connected members having a shaft mounted at each end thereof, a pair of said separate connected members each having at least one end formed into a slot, a said slot of one of said pair of said separate connected members engages with one of said shafts while the said slot of the other of said separate connected members engages with the other of said shafts; and one of said separate connected members being formed of two in number of members, said two in number of members being connected together by a third member, one of said two in number of members being slidable on said third member toward and away from the other of said two in number of members, a biasing means located about said third member exerting a continuous bias upon said two in number of members tending to locate said two in number of members as close together as possible, a pivotable cam mounted on one of said two in number of members, said pivotal cam to be pivoted pushing against the other of said two in number of members causing said two in number of members to move apart against the bias of said biasing means thereby permitting disassociation of said separate connected members from said housing.

5. The welding apparatus as defined in claim 4 wherein:

each said two in number of members having an outer end, both said two in number of members having a said slot formed at said outer end of each of said two in number of members.

6. The welding apparatus as defined in claim 5 wherein:

said housing being constructed of a main member and a removable member, with said removable member being disassociated from said main member, there being an access opening permitting transverse entry into said internal opening, said removable member and said main member being connected together through a tongue and groove arrangement.

* * * * *